Sept. 3, 1940. A. H. TINNERMAN 2,213,234
PANEL JOINT CONSTRUCTION
Filed Aug. 19, 1938
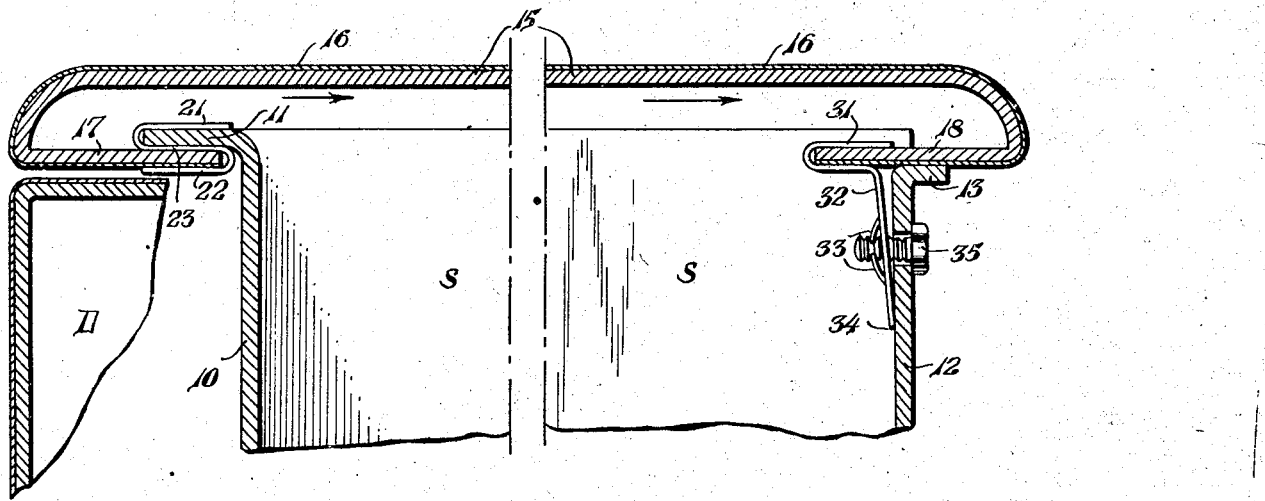
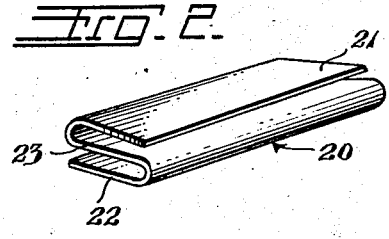
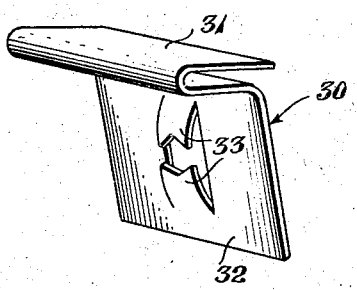
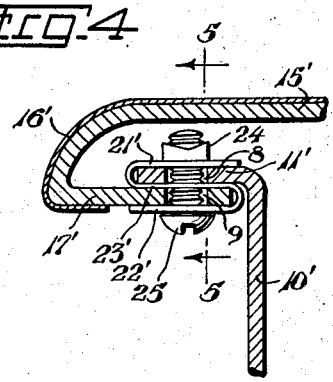
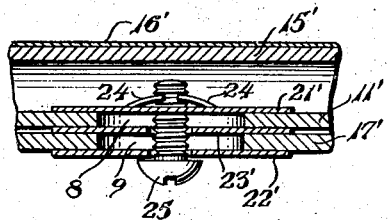
Inventor:
ALBERT H. TINNERMAN
By H. S. Lombard,
Attorney Patented Sept. 3, 1940

2,213,234

UNITED STATES PATENT OFFICE 2,213,234

PANEL JOINT CONSTRUCTION

Albert H. Tinnerman, Cleveland, Ohio, assignor to Tinnerman Products, Inc., Cleveland, Ohio, a corporation of Ohio Application August 19, 1938, Serial No. 225,833

16 Claims. (Cl. 189—35)

This invention relates to joint constructions generally and, more particularly, to a panel joint construction especially useful in the fabrication of sheet metal structures such as ranges, utility cabinets, refrigerators and the like.

The present day demand for sheet metal structures having enamelled finish surfaces has resulted in the use of relatively large interfitting enamelled panels which heretofore have been connected simply by a conventional threaded nut and bolt in a well known manner. It has been found, however, that in the use of such bolt fastenings especially where two enamelled parts are bolted directly together, undue stresses and strains are set up in the assembly resulting in objectionable chipping and cracking of the enamel which, of course, mars the appearance of the finished product.

Cracking and chipping of the enamelled finish surface is often not apparent at the time the structure is assembled and sold to the consumer but quickly becomes noticeable after a period of use. For example, in a range construction after the range has been put to use and subjected to heat causing relative expansion and contraction under alternate conditions of heating and cooling, relative movement of the respective parts of the assembly will necessarily take place incident to such expansion and contraction. This relative movement of the parts of an assembly naturally causes damaging stresses and strains to be transmitted to the areas of the panels bolted rigidly together and results in objectionable chipping, checking and crazing of the enamelled surfaces secured by the bolt fastenings and thereafter spreading to adjacent areas of the panels exposed to view such that the finish of the panel is unsightly and must be replaced. This is often the case in a structure comprising body panels which must be securely held in assembled relation and are therefore rigidly and tightly bolted when initially installed. The objection to the cracking and chipping of enamel does not involve merely the cost of replacing a damaged panel, but also the problem of matching the color thereof to correspond with that of the remaining structure which naturally becomes dull and faded after a period of use.

A primary object of the invention therefore is to provide a panel joint construction comprising interfitting enamelled panels and the like rigidly and securely held in assembled relation without mechanical pressure in the joint at the initial installation thereof or incident to relative movement of the parts taking place, for example, under alternate conditions of expansion and contraction during use.

A further object is to provide a joint construction for enamelled panels and the like by which such panels are securely held in operative position while providing for relative movement between the connected parts to compensate for inaccuracies and manufacturing variations therein or to permit suitable relative movement of the parts in assembled relation to damped undue stresses and strains set up in the joint and thereby minimize possibility of checking or cracking of the enamelled surfaces thereof.

Another object is to provide in such a panel construction, substantial clip securing devices comprising a resilient gripping member engaging a connecting flange of the panel or the like to securely hold the same in operative position yet capable of yielding sufficient to compensate for limited relative movement of the connected parts of the joint and thereby eliminate damaging mechanical pressure in the joint, and particularly on the enamelled finish surface of the panel.

Still another object is to provide a clip for such a panel joint construction comprising a pair of resilient gripping members one of which engages the connecting flange of the panel and the other a flange on the supporting structure whereby said flanges are securely held in superimposed relation in a completed installation and relative movement of the connected parts is provided for by the yielding action of both said resilient gripping members.

A further obect is to provide a panel fastening construction comprising a joint provided by such a clip embodying a pair of gripping members securing the panel by its connecting flange to a supporting structure at one end and a locked mounting provided by complementary fastening means engaging the panel at the opposite end thereof to urge the parts of said joint in a direction opposed to disassociation or removal.

A more specific object is to provide a mounting for a panel or the like comprising a joint at one end provided by a clip having a pair of resilient gripping members engaging a flange on the panel to secure the same to a supporting structure, and complementary clip fastening means comprising a resilient gripping member engaging an opposite flange of the panel to urge the parts of said joint in a direction opposed to removal in providing a locked mounting for the panel without mechanical pressure on the finish surface thereof at any point.

A still further object is for the provision of a joint comprising a clip having a pair of resilient gripping members retaining the superposed flanges of cooperating parts in assembled relation together with a bolt fastening engaging integral bolt receiving means provided on one of said gripping members of the clip to lock said flanges in assembled relation while providing for limited relative movement of such connected parts in a completed installation.

Further objects and advantages of the invention and other new and useful features in the construction, arrangement and general combination of parts will be apparent to those skilled in the art as a description thereof proceeds with reference to the accompanying drawing in which like reference characters designate like parts throughout the same, and in which:

Fig. 1 is a detail sectional view of a complete panel mounting showing the improved panel joint construction of the invention;

Fig. 2 is a perspective of the clip per se employed in the panel joint construction illustrated in the left portion of Fig. 1;

Fig. 3 is a perspective of the clip per se employed in the right portion of Fig. 1 for providing a locked panel mounting;

Fig. 4 shows in section an alternate joint construction embodying a modified form of clip comprising integral bolt engaging means adapted to receive a threaded fastening in providing a locked connection for the joint; and Fig. 5 is a section taken on a line 5—5 of Fig. 4 looking in the direction of the arrows.

The invention is illustrated and described in connection with a range or stove construction which, in present day manufacture, comprises relatively large interfitting panels having enamelled or porcelain finish surfaces usually required to be connected directly together in a completed installation. It will be understood, however, that the joint construction and panel mounting disclosed herein is one of general utility and admirably suited for use in practically any installation comprising a cabinet, casing or similar sheet metal structure.

In the fabrication of structures comprising enamelled or porcelain panels a most difficult problem is involved in the mounting of the panels rigidly and securely in a completed installation without placing the enamelled or porcelain finish surfaces thereof under mechanical pressure which would cause chipping or cracking of such enamel either at the time of the initial installation or after a period of use. In a range construction this problem is even more serious since under alternate conditions of heating and cooling, there is corresponding expansion and contraction causing relative movement in the interfitted enamelled parts of the structure, and if such parts are rigidly secured under mechanical pressure as by a bolt fastening connected directly thereto, cracking, chipping and crazing of the enamelled finish surfaces will inevitably follow.

Generally speaking, the present invention provides an improved joint construction for this purpose is an arrangement dispensing with the use of bolts and similar fastenings applied directly to the finish surface of a panel or like part such that no material degree of pressure is present in the joint and no undue stresses or strains are transmitted to the layer of porcelain or enamel thereon. And thus, by incorporating in the structure substantial spring clip fastenings comprising gripping elements resiliently engaging the panel and preferably at points removed from the exposed surfaces thereof, sufficient resiliency is provided in the joint or connection to avoid fracture of the enamel surface of the panel as a result of strains set up either during the assembly or use of the range. Such clip fastenings also serve to hold the panels in alignment and reinforce the joint or connection while allowing for the necessary slight degree of movement between the panels caused by the uneven distribution of heat in the range when put to use.

Referring now, more particularly, to the drawing, Fig. 1 shows in section the improved joint construction as embodied in a panel mounting for the side panels or top plate of a range, for example. The usual range construction includes an inner supporting frame structure, designated generally S, provided from suitable beams, L-shapes, angle irons, brackets and the like which present a vertical flange in the approximate front corner of the supporting structure, and which in the mounting for the side panels is suitably designed to provide an offset portion to accommodate the usual oven or broiler door D opening to the front of the range in a well known manner.

Thus as shown to the left in Fig. 1, the supporting structure S may comprise a wall member 10 having a flange 11 which is employed in providing the joint for securing the panel thereto in combination with suitable fastening means applied to the rear portion of the frame structure, shown to the right. In this respect the present invention contemplates the provision of a complete mounting for the panel secured to both front and rear or at either end thereof by substantial clip fastenings providing a resilient mounting throughout. The finishing panel 15 or like part having a layer of enamel or porcelain 16 is usually formed with inturned connecting flanges 17, 18. The flange 17 is disposed in close proximity to the flange 11 of the supporting structure and in order to hold such flanges in assembled relationship without subjecting the same to mechanical pressure which would damage the enamelled surfaces, there is interposed therebetween a clip fastening 20, Fig. 2 comprising a pair of resilient gripping members designed to provide a joint which is rigid and secure yet sufficiently resilient to allow the necessary slight degree of relative movement of the panels caused by the expansion and contraction incident to alternate conditions of heat and cooling.

As best seen in Fig. 2, the clip fastening just described comprises a simple substantially S-shaped device which may be inexpensively constructed in one piece from a small section of sheet metal, preferably spring steel. The clip thus provided consists of a pair of gripping members 21, 22 extending in opposite directions and spaced by an intermediate web portion 23. The upper gripping element 21 is, of course, designed in accordance with the thickness of the flange 11 of the supporting structure and is so spaced with respect to the web portion 23 as to rigidly clamp such flange when applied thereto as shown in Fig. 1. Likewise, the gripping member 22 is designed with such spacing from the web portion as to frictionally and grippingly engage the inturned flange 17 of the finishing panel with perhaps not quite so much rigidity in order to facilitate application of such flange thereto with a minimum of effort and without endangering the enamel or porcelain finish surface thereof.

In forming the desired panel joint construction with the parts provided substantially in the manner aforesaid, a suitable number of such clips 20 as necessary or desirable are assembled onto the flange 11 of the supporting structure by spreading the gripping member 21 of each clip from the web portion 23 sufficient to admit the flange edge whereupon such gripping member may be driven home, as by hammer blows, in what may be termed a drive or press fit to fully embrace the said flange of the supporting structure. Thus the gripping member 22 extends free to the reverse side of the flange and is thereby readily adapted to receive the inturned flange 17 of the enamelled panel in providing the desired mounting in which the entire panel is easily and quickly applied to the area to be covered in a completed installation.

With the clips thus assembled onto the supporting structure, the finishing panel may be mounted in an installation embodying the improved joint construction by applying the edge of the inturned flange 17 to the yieldable gripping member 22 of each clip after which the panel is moved toward the rear of the structure as necessary, in the direction indicated by the arrows to dispose said gripping member 22 in full clamping engagement with the flange substantially as shown. In this relation, the intermediate web portions 23 of the clips serve as excellent spacer means whereby the enamelled or other finish surfaces of the connecting flanges are held slightly apart to thereby dampen and otherwise compensate for any stresses or strains in the joint which would cause chipping or cracking of the enamel. At the same time, the gripping members 21, 22 of the clip resiliently embrace such flanges in rigid, frictional clamping engagement to maintain the parts connected in assembled relation, yet capable of yielding sufficient to allow for the necessary slight degree of relative movement under expansion and contraction incident to alternate conditions of heat and cooling.

With the panel initially assembled onto the supporting structure by the improved joint construction substantially in a manner described, it is, of course, necessary to employ additional fastening means for securing the opposite end of the panel in providing a locked mounting for the panel in a completed installation. To this end, there may be employed any suitable bolt and nut fastening means fixedly retaining the panel against relative movement with respect to the supporting structure and this necessarily prevents any relative movement of the panel in a direction toward removal of the flange 17 thereof from the gripping member 22 or disassociation of gripping member 21 from supporting flange 11 in the assembled relation of the parts of the joint.

However, if it is desired that no mechanical pressure shall exist at any point in the panel mounting, it is impractical to employ a bolt fastening as the primary fastening medium and it is therefore found necessary to provide a substantial auxiliary clip fastening designed to effect not only a locked but resilient mounting for the panel.

A preferred construction of this character may be provided in the use of a substantial hook-shaped retainer clip 30 such as shown in Fig. 3. It will be noted that the flange 18 of the panel rests upon a beading or rib 13 to the rear of the supporting structure with the edge thereof projecting beyond the wall 12 into the interior of the supporting structure. The projecting flange edge thus presented serves as an excellent means to which a retainer clip of the character shown in Fig. 3 may be attached in providing the desired locked and resilient mounting for the panel. The said clip 30 is constructed from an inexpensive section of sheet metal preferably spring steel, and is designed with a hook portion 31 extending from a base plate 32 provided with suitable bolt engaging means 33. Such bolt engaging means may, of course, be merely a threaded nut spot welded to the base plate 32 or assume the form of an interiorly threaded protuberance or equivalent lug elements struck and formed therefrom and designed for engaging a bolt or screw fastening substantially in the manner of a self locking nut. The provision of the bolt engaging means in the manner of cooperating tongues struck and formed from the base plate, as shown, is preferable in that such tongues are yieldable and thereby add to the resiliency of the connection in providing an exceptionally resilient mounting for the panel throughout.

A further advantage in the provision of such bolt receiving means in the form of cooperating tongues, resides in the fact such tongues are possessed of unusual inherent strength and will not collapse or pull through on tightening of the bolt nor loosen from fastening engagement under constant strain, heavy usage and rough handling of the installation. This takes place as a result of the fastening action of such tongues in moving toward each other to dig into the grooves intermediate adjacent threads on tightening of the bolt or screw to become embedded in the root diameter of such threaded member in locked, frictional fastening engagement therewith. Thus, any vibration, jarring or strain taking place in a completed mounting cannot cause displacement, reverse rotation or tend toward unscrewing of the threaded fastening member from applied fastening position. It will therefore be appreciated that in the provision of such integral bolt receiving means in the retainer clip, the use of individual threaded nuts or lock washers of any kind is entirely dispensed with thereby making for a considerable saving not only in the cost of such nuts and lock washers, but also materially reducing the expense and labor involved in the tedious, time-consuming assembling operations which such fastenings require.

The retainer clip is formed with the elements of the hook portion 31 suitably spaced to frictionally and grippingly engage the flange 18 of the panel with the attaching base plate portion 32 thereof preferably inclined with respect to the hook such that when the device is applied to the assembly to complete the panel mounting, the extremity of said base plate bears against the supporting wall as at 34 and is otherwise disposed in spaced relation thereto. Accordingly, when the bolt fastening 35 is applied to the bolt engaging means 33, this spaced relation of the base plate from the wall member permits the clip to flex on being drawn up and thereby retain the panel in a highly resilient connection. Thus in a completed panel mounting, the enamelled finishing panel is retained on the supporting structure by resilient connections at either end thereof serving to minimize possibility of cracking or chipping of the enamel at any point.

At the same time, the clip provides a positive locked mounting for the panel inasmuch as the force of tightening the bolt fastening 35 to retain the flange 18 by hook 31, also serves to draw the panel and the flange 17 thereof in a direction opposed to removal or disassociation from the joint provided by clip 20. And since the panel cannot possibly be dismounted without unscrewing and removal of the bolt fastening 35, it is quite obvious that the mounting thus provided not only is exceptionally rigid and secure throughout, but is one in which the panel is held in a locked mounting and not subject to accidental removal or loosening causing squeaks, rattling or other objectionable noises and sounds.

Figs. 4 and 5 show an alternate arrangement for providing a locked mounting embodying substantially the joint construction shown in the left portion of Fig. 1, and comprising a finishing panel 15' or the like having an inturned flange 17' and provided with a layer of enamel 16' which need not extend over the entire area of the flange. The superposed flanges 17' and 11', of the panel 15' and supporting structure 10' respectively, are provided with suitably aligned passages 8, 9, which preferably are elongated slots to provide for any required adjustment of the parts of the joint. The clip also is provided with bolt passages in the gripping member 22' and web portion 23' while the gripping member 21' includes integral bolt engaging means 24 struck and formed therefrom and similar to the type described with reference to those shown in Fig. 3.

The joint which may be provided by this construction is essentially the same as that shown in Fig. 1 in that the gripping member 21' of the clip engages the flange 11' of the supporting structure while the gripping member 22' resiliently engages the inturned flange 17' of the panel to rigidly secure the connected parts in assembled relation, yet capable of yielding sufficient to allow for any necessary slight degree of relative movement. In this relation, the respective bolt passages 8, 9 in the superposed flanges of the connected parts and those in the clip are in suitable alignment to receive a bolt 25 adapted to threadedly engage the yieldable bolt engaging means 24 as shown in Fig. 5. The bolt need not be drawn taut unless desired since the clip provides the required connection with the shank of the bolt serving to prevent disassociation or removal of the connecting flanges from assembled relation with the gripping members of the clip to provide the necessary locked joint construction. And inasmuch as the integral bolt engaging means 24 are preferably yieldable, it is quite apparent that the resiliency of the joint is preserved and the respective parts thereof so connected as to allow for the necessary slight degree of relative movement under expansion and contraction incident to alternate conditions of heating and cooling taking place, for example, in the use of a range.

While the invention has been described in detail with specific examples such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In combination, a supporting structure including a connecting flange, a part mounted thereon having an inwardly extending flange arranged in underlying relation to said connecting flange on the supporting structure, and a clip fastening comprising an intermediate web portion and resilient gripping members on either side thereof, one of said gripping members resiliently engaging the inwardly extending flange on said part to secure said flange onto the rearward side of said connecting flange of the supporting structure and the other being connected to the flange on the supporting structure and concealed by the body of said part and said inwardly extending flange thereon, said web portion of the clip being interposed between said flanges to hold the same in spaced relation in providing a resilient joint adapted to compensate for strains set up in the assembly or incident to use of the structure.

2. In combination, a supporting structure including a connecting flange, a part mounted thereon having an inwardly extending flange arranged in underlying relation to said connecting flange on the supporting structure, and a substantially S-shaped clip fastening comprising an intermediate web portion provided with resilient gripping members on either side thereof, one of said gripping members resiliently engaging the inwardly extending flange on said part to secure said flange onto the rearward side of said connecting flange of the supporting structure and the other being connected to the flange on the supporting structure and concealed by the body of said part and said inwardly extending flange thereon in the mounted position of said part on the supporting structure, said web portion of the clip being interposed between said flanges to hold the same in spaced relation in providing a resilient joint adapted to compensate for strains set up in the assembly or incident to use of the structure.

3. In combination, a supporting structure including a connecting flange and presenting an area to be covered, a part mounted thereon to cover said area, said part comprising a panel or the like having an inwardly extending flange arranged in underlying relation to that on said supporting structure, and a substantially S-shaped clip fastening comprising an intermediate web portion and resilient gripping members on either side thereof, one of said gripping members resiliently engaging the inwardly extending flange of said panel to secure said flange onto the rearward side of said connecting flange of the supporting structure and the other engaging the flange on the supporting structure with the body of said panel and said inwardly extending flange thereon substantially concealing the same, said web portion of the clip being interposed between said flanges to secure the same in spaced relation in providing a resilient joint adapted to compensate for strains set up in the assembly or incident to use of the structure.

4. In combination, a supporting structure including a connecting flange, a part mounted thereon comprising a panel or the like having an inwardly extending flange arranged in underlying relation to that on said supporting structure, and a clip fastening comprising an intermediate web portion and resilient gripping members on either side thereof, one of said gripping members resiliently engaging the inwardly extending flange of said panel to secure said flange onto the rearward side of said connecting flange of the supporting structure and the other being connected to the flange on the supporting structure and concealed by the body of said panel and said inwardly extending flange thereon in the mounted position of said panel on the supporting structure, said web portion of the clip being interposed between said flanges to hold the same in spaced relation in providing a resilient joint adapted to compensate for strains set up in the assembly or incident to use of the structure, and means securing the panel against relative movement in mounted position such that the flanges connected by said clip fastening are retained against disassociation and removal.

5. In combination, a supporting structure including a connecting flange and presenting an area to be covered, a part mounted thereon to cover said area comprising a panel or the like having an inwardly extending flange arranged in underlying relation to that on said supporting structure, and a substantially S-shaped clip fastening comprising an intermediate web portion and resilient gripping members on either side thereof, one of said gripping members resiliently engaging the inwardly extending flange of said panel to secure said flange onto the rearward side of said connecting flange of the supporting structure and the other engaging the flange on the supporting structure with the body of said panel and said inwardly extending flange thereon substantially concealing the same, said web portion of the clip being interposed between said flanges to secure the same in spaced relation in providing a resilient joint adapted to compensate for strains set up in the assembly or incident to use of the structure, and means securing the panel in mounted position, said means urging the panel in a direction opposed to disassociation and removal of the inwardly extending flange thereon in connected engagement with said clip.

6. In combination, a supporting structure including a connecting flange, a part mounted thereon having an enamelled finish surface and an inturned flange arranged in underlying relation to that on said supporting structure, and a clip fastening comprising an intermediate web portion and resilient gripping members on either side thereof, one of said gripping members resiliently engaging the flange of said part to be mounted to secure said flange onto the rearward side of said connecting flange of the supporting structure and the other being connected to the flange on the supporting structure and concealed by the body of said part in the assembled relation thereof on said supporting structure, said web portion of the clip being interposed between said flanges to hold the same in spaced relation in providing a resilient joint adapted to compensate for strains set up in the assembly or incident to use of the structure and thereby minimizing possibility of fracture of the enamelled finish surface of said part mounted on the supporting structure.

7. In combination, a supporting structure including a connecting flange, a part mounted thereon having an enamelled finish surface and an inturned flange arranged in underlying relation to that on said supporting structure, and a substantially S-shaped clip fastening comprising an intermediate web portion and resilient griping members on either side thereof, one of said gripping members resiliently engaging the flange of said part to be mounted to secure said flange onto the rearward side of said connecting flange of the supporting structure and the other engaging the flange on the supporting structure with the body of said part overlying and concealing the same said web portion of the clip being interposed between said flanges to secure the same in spaced relation in providing a resilient joint adapted to compensate for strains set up in the assembly or incident to use of the structure and thereby minimizing possibility of fracture of the enamelled finish surface of said part mounted on the supporting structure.

8. An installation of the class described comprising, in combination, a supporting structure having a flange and presenting an area to be covered by a panel or the like, a panel or like part having an inturned connecting flange mounted on said supporting structure, and retaining means for securing said panel to the supporting structure comprising a substantial hook member having a pair of jaws embracing said connecting flange of the panel, and a base plate provided with bolt engaging means adapted for receiving a bolt fastening to attach the same to the supporting structure and maintain the jaws of said hook member in engagement with said connecting flange in the applied mounted position of said panel.

9. An installation of the class described comprising, in combination, a supporting structure having a flange and presenting an area to be covered by a panel or the like, a panel or like part having an inturned connecting flange mounted on said supporting structure, and retaining means for securing said panel to the supporting structure comprising a pair of members one of which is a substantial hook comprising a pair of jaws embracing said connecting flange of the panel, and the other member a locking plate provided with bolt engaging means receiving a bolt fastening to attach the same to the supporting structure and urge said hook member in a direction opposed to removal of said jaws from engagement with said connecting flange in providing a substantially locked mounting for said panel.

10. An installation of the class described comprising, in combination, a supporting structure having a flange and presenting an area to be covered by a panel or the like, a panel or like part having an inturned connecting flange mounted on said supporting structure, and retaining means for securing said panel to the supporting structure comprising a one-piece sheet metal device having a substantial hook comprising a pair of jaws embracing the free end of said connecting flange of the panel, and a resilient base plate provided with integral yieldable bolt engaging means struck and formed therefrom for receiving a bolt fastening to attach the same to the supporting structure and urge said hook member in a direction opposed to removal of the jaws thereof from engagement with said free end of the connecting flange, whereby a substantially locked mounting for said panel is provided under continuously effective spring tension provided by said resilient base plate and yieldable bolt engaging means struck and formed therefrom.

11. An installation of the class described comprising, in combination, a supporting structure including a connecting flange and presenting an area to be covered, a member to be mounted on said structure to cover said area comprising a panel body having an inturned flange adapted to be assembled in juxtaposed relation to the connecting flange on said supporting structure, a substantially S-shaped clip fastening comprising a pair of oppositely extending resilient gripping members, one of said gripping members being applied to the forward side of the connecting flange of said supporting structure with the other gripping member extending free to the reverse side thereof and adapted to receive the inturned flange of the panel body at such reverse side of the connecting flange, said panel body in mounted position overlying and concealing the connecting flange of the supporting structure and the gripping member of the clip fastening applied thereto in a completed installation, and a retainer maintaining the panel body against relative movement in such mounted position comprising a hook portion and a base plate provided with bolt thread engaging means receiving a bolt securing the same to said supporting structure, said hook portion engaging an opposite flange on said panel body and urging the same in a direction opposed to disassociation of the said inturned flange thereof in connected engagement with said clip.

12. An installation of the class described comprising, in combination, a supporting structure including a connecting flange and presenting an area to be covered by a panel to be mounted thereon, a panel having an enamelled finish surface and an inturned flange adapted to be assembled in juxtaposed relation to the connecting flange on said supporting structure, a substantially S-shaped clip fastening for connecting said flanges in a resilient joint comprising an intermediate web and a pair of oppositely extending resilient gripping members, one of said gripping members of the clip being applied to the forward side of the connecting flange of said supporting structure with the other gripping member extending free to the reverse side thereof and adapted to receive the inturned flange of the panel to secure the same at such reverse side of the connecting flange, said intermediate web of the clip being interposed between said flanges to serve as a substantial spacer providing a resilient joint adapted to compensate for strains set up in the assembly or incident to use of the structure and thereby minimizing possibility of fracture of the enamelled finish surface of said panel, said finish surface of the panel concealing the connecting flange of the supporting structure and the gripping member of the clip fastening applied thereto in the mounted position of said panel in a completed installation, and a retainer maintaining the panel against relative movement in such mounted position comprising a hook portion and a base plate provided with bolt engaging means receiving a bolt securing the same to said supporting structure, said hook portion engaging an opposite flange on said panel and urging the same in a direction opposed to disassociation of the said inturned flange thereof in connected engagement with said clip.

13. An installation of the class described comprising, in combination, a supporting structure including a connecting flange and presenting an area to be covered by a panel to be mounted thereon, a panel having an enamelled finish surface and an inturned flange adapted to be assembled in juxtaposed relation to the connecting flange on said supporting structure, a substantially S-shaped clip fastening for connecting said flanges in a resilient joint comprising an intermediate web and a pair of oppositely extending resilient gripping members, one of said gripping members of the clip being applied to the forward side of the connecting flange of said supporting structure with the other gripping member extending free to the reverse side thereof and adapted to receive the inturned flange of the panel to secure the same at such reverse side of the connecting flange, said intermediate web of the clip being interposed between said flanges to serve as a substantial spacer providing a resilient joint adapted to compensate for strains set up in the assembly or incident to use of the structure and thereby minimizing possibility of fracture of the enamelled finish surface of said panel, said finish surface of the panel overlying and concealing the connecting flange of the supporting structure and the gripping member of the clip fastening applied thereto in the mounted position of said panel in a completed installation, and a retainer maintaining the panel against relative movement in such mounted position comprising a hook portion and a base plate provided with integral bolt engaging means receiving a bolt securing the same to said supporting structure, said hook portion comprising a pair of jaws embracing an opposite inturned flange on said panel and urging the same in a direction opposed to disassociation of the parts of the resilient joint comprising the inturned flange thereof in connected engagement with said clip.

14. In combination, a supporting structure including a connecting flange having a bolt passage, a part mounted thereon having an inwardly extending flange arranged in underlying relation to said connecting flange on the supporting structure and provided with a bolt passage aligned with said bolt passage in the connecting flange of the supporting structure, and a clip fastening device comprising an intermediate web portion and resilient gripping members on either side thereof, one of said gripping members resiliently engaging the inwardly extending flange on said part to secure said flange onto the rearward side of said connecting flange of the supporting structure, the other gripping member being connected to the flange on the supporting structure and concealed by the body of said part and said inwardly extending flange thereon, said web portion of the clip being interposed between said flanges to hold the same in spaced relation in providing a resilient joint, one of said gripping members being provided with means for engaging a stud fastener passing through the aligned bolt passages in said flanges.

15. In combination, a supporting structure including a connecting flange having a bolt passage, a part mounted thereon having an inwardly extending flange arranged in underlying relation to said connecting flange on the supporting structure and provided with a bolt passage aligned with said bolt passage in the connecting flange of the supporting structure, and a sheet metal clip fastening device comprising an intermediate web portion and resilient gripping members on either side thereof, one of said gripping members resiliently engaging the inwardly extending flange on said part to secure said flange onto the rearward side of said connecting flange of the supporting structure, the other gripping member being connected to the flange on the supporting structure and concealed by the body of said part and said inwardly extending flange thereon, said web portion of the clip being interposed between said flanges to hold the same in spaced relation in providing a resilient joint one of said gripping members being provided with means struck and formed therefrom for threadedly engaging a threaded fastener passing through the aligned bolt passages in said flanges.

16. In combination, a supporting structure including a connecting flange having a bolt passage, a part mounted thereon having an inwardly extending flange arranged in underlying relation to said connecting flange on the supporting structure and provided with a bolt passage aligned with said bolt passage in the connecting flange of the supporting structure, and a substantially S-shaped, sheet metal clip fastening device comprising an intermediate web portion and resilient gripping members on either side thereof, one of said gripping members resiliently engaging the inwardly extending flange on said part to secure said flange onto the rearward side of said connecting flange of the supporting structure, the other gripping member being connected to the flange on the supporting structure and concealed by the body of said part and said inwardly extending flange thereon, said web portion of the clip being interposed between said flanges to hold the same in spaced relation in providing a resilient joint, one of said gripping members including integral thread engaging means struck and formed therefrom for threadedly engaging a threaded fastener passing through the aligned bolt passages in said flanges in providing a locked connection therefor.

ALBERT H. TINNERMAN.